United States Patent
Masy et al.

(10) Patent No.: US 10,301,419 B2
(45) Date of Patent: May 28, 2019

(54) METHOD FOR MAKING PROPYLENE OXIDE/ETHYLENE OXIDE COPOLYMERS USING DOUBLE METAL CYANIDE CATALYSTS, AND COPOLYMERS SO MADE

(71) Applicant: Dow Global Technologies LLC, Midland, MI (US)

(72) Inventors: Jean-Paul Masy, Destelbergen (BE); David A. Babb, Lake Jackson, TX (US); Irena Amici-Kroutilova, Waedenswil (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/735,179

(22) PCT Filed: Jun. 20, 2016

(86) PCT No.: PCT/US2016/038427
§ 371 (c)(1),
(2) Date: Dec. 9, 2017

(87) PCT Pub. No.: WO2017/003749
PCT Pub. Date: Jan. 5, 2017

(65) Prior Publication Data
US 2018/0155485 A1 Jun. 7, 2018

Related U.S. Application Data

(60) Provisional application No. 62/187,130, filed on Jun. 30, 2015.

(51) Int. Cl.
*C08G 18/48* (2006.01)
*C08G 65/26* (2006.01)
*C08G 71/04* (2006.01)
*C08J 9/00* (2006.01)

(52) U.S. Cl.
CPC ....... *C08G 18/485* (2013.01); *C08G 65/2606* (2013.01); *C08G 65/2609* (2013.01); *C08G 65/2663* (2013.01); *C08G 65/2696* (2013.01); *C08G 71/04* (2013.01); *C08J 9/0061* (2013.01); *C08G 2650/58* (2013.01); *C08J 2375/08* (2013.01)

(58) Field of Classification Search
CPC ............ C08G 65/2606; C08G 65/2609; C08G 65/2663; C08G 65/2696; C08G 18/485; C08G 71/04; C08G 2650/58; C08J 2375/08; C08J 9/0061
See application file for complete search history.

(56) References Cited

U.S. PATENT DOCUMENTS

| 5,648,559 A | 7/1997 | Hagar |
| 6,884,826 B2 | 4/2005 | Le-Khac |
| 2005/0096488 A1 | 5/2005 | Kaushiva |
| 2008/0161509 A1 | 7/2008 | Ostrowski |

FOREIGN PATENT DOCUMENTS

| WO | 99/51657 A | 10/1999 |
| WO | 99/51661 A | 10/1999 |
| WO | 2012/027113 A | 3/2012 |

*Primary Examiner* — Rosalynd A Keys

(57) ABSTRACT

Random poly(propylene oxide-co-ethylene oxide) polymers are made by polymerizing a mixture of propylene oxide and a small amount of ethylene oxide in the presence of a starter and a double metal cyanide catalyst complex, and then feeding in a mixture of propylene oxide and ethylene oxide while increasing the ethylene oxide concentration in the mixture to at least 90%. This produces a polyol suitable for making high resiliency polyurethane foam without need for adding an ethylene oxide cap.

9 Claims, No Drawings

METHOD FOR MAKING PROPYLENE OXIDE/ETHYLENE OXIDE COPOLYMERS USING DOUBLE METAL CYANIDE CATALYSTS, AND COPOLYMERS SO MADE

This invention relates to methods for making propylene oxide/ethylene oxide copolymers.

Propylene oxide/ethylene oxide copolymers are made in industrial quantities. They are extensively used as raw materials for making polyurethanes. The copolymers in most cases are copolymers of mostly propylene oxide and a smaller amount of ethylene oxide.

The polymerized ethylene oxide has two main effects on the properties of the copolymer. Firstly, it makes the copolymer more hydrophilic. This can be beneficial in some cases, as it can improve the compatibility of the copolymer with other components of a polyurethane-forming formulation.

Secondly, the ethylene oxide forms a primary hydroxyl group when polymerized at the end of the polymer chains. Primary hydroxyl groups are more reactive towards isocyanate groups than are the mainly secondary hydroxyl groups formed when propylene oxide adds to the end of the chain. The increased reactivity is often beneficial and in some cases even essential. Therefore, a very common type of propylene oxide/ethylene oxide copolymer has chain ends that are capped by homopolymerizing ethylene oxide to provide a high primary hydroxyl content and obtain the desired reactivity. For example, polyether polyols used in making high resiliency foam are commonly polypropylene oxide) polymers capped with 10 to 20% by weight ethylene oxide. These normally have equivalent weights of 1200 to 3000 and 70% or more of the hydroxyl groups are primary.

The ethylene oxide capped polymers are almost always made in an anionic polymerization using potassium hydroxide or other strong base as the polymerization catalyst. As is well-known, there are significant drawbacks to these anionic polymerization methods. One is that propylene oxide isomerizes in the presence of strong bases to produce propenyl alcohol and/or allylic alcohol. These alcohols function as monofunctional initiators, and the polyether product therefore is a mixture of the desired polyfunctional compounds and monofunctional compounds. Products of 1500 or higher equivalent weight made in an anionic polymerization process may contain 25% or more of monofunctional species.

The second problem with anionic polymerization is that the polyol must be scrupulously worked up to remove catalyst residues. This adds considerable expense to the manufacturing process.

The potential solution to both of these problems is to produce the polyether using a double metal cyanide catalyst (DMC) complex. These catalysts are known to produce polyethers having low levels of monofunctional impurities. In addition, the catalyst residues can be left in the product, so manufacturing costs potentially are lower.

Unfortunately, it is well known that DMC catalysts are unable to produce ethylene oxide-capped poly(propylene oxide)s, except for very short caps, and then only under limited circumstances. Despite the growing adoption of DMC catalyst technology to make poly(propylene oxide) homopolymers and some propylene oxide/ethylene oxide random copolymers, this technology has not found commercial acceptance for producing polyether having terminal ethylene oxide caps or high proportions of primary hydroxyl groups.

Some attempts have been made to circumvent this problem by forming block copolymers using DMC catalysts. These have an internal poly(propylene oxide) homopolymer segment, and one or more outer blocks that are made by copolymerizing propylene oxide and ethylene oxide. This allows the proportion of primary hydroxyl groups to be increased somewhat. Thus, for example, in U.S. Pat. No. 5,648,559, a 700 molecular weight poly(propylene oxide) is alkoxylated with a mixture of up to about 13% ethylene oxide and 87 to 100% propylene oxide, and then capped with an alkylene oxide mixture that contains 40% or more ethylene oxide. The polyether has an innermost poly(propylene oxide) segment that constitutes somewhat more than 10% of the weight of the polymer, an intermediate segment having 0 to 13% by weight polymerized ethylene oxide, and an outermost segment containing 40% or more ethylene oxide. The outermost segment can constitute as much as 50% of the polymer weight. However, this produces polyols having at most about 39% primary hydroxyl groups.

U.S. Pat. No. 6,884,826 describes a process in which a propoxylated initiator is alkoxylated with propylene oxide by itself, and then with a mixture of ethylene oxide and propylene oxide, in which the proportion of ethylene oxide is increased to 100% as the reaction proceeds. A short ethylene oxide cap is then added. The product therefore has a large internal block of homopolymerized propylene oxide, capped with a block of copolymerized ethylene oxide and propylene oxide and finally a short block of homopolymerized ethylene oxide. This patent reports primary hydroxyl contents of about 50 to 68 percent. However, the products are characterized in the patent as being "hazy". In addition, the external poly(ethylene oxide) cap causes a large viscosity increase in the product, as reported in Table V of the patent. Without the cap, the process of U.S. Pat. No. 6,884,826 still produces a hazy product, while having a very low primary hydroxyl content. This haziness and high viscosity are significant problems, especially when the polymer is used to make polyurethanes. The haziness indicates that some crystallization is occurring, which adversely affects storage stability and compatibility with other materials in a foam formulation. The high viscosity increases the energy needed to process the polymer through equipment and can also place limits on formulations that include the polymer. An additional drawback of this process is the need to perform the ethylene oxide capping at the end, which increases complexity and cost.

US 2005/0096488 describes yet another process, which circumvents the problem of producing high amounts of primary hydroxyls using a DMC catalyst. In US 2005/0096488, propylene oxide is polymerized using the DMC catalyst, and then an ethylene oxide cap is polymerized onto the end of the chain in an anionic polymerization, using a conventional potassium hydroxide catalyst. This process works from a technological standpoint, but re-introduces the need to remove catalyst residues after the anionic polymerization step, and therefore much of the advantage of using a DMC catalyst in the first place is lost.

This invention is in one aspect a random polypropylene oxide-co-ethylene oxide) polymer having a hydroxyl equivalent weight of 1500 to 3000, the random polymer comprising one or more polyether chains extending from the residue of a hydroxyl-containing starter compound having a hydroxyl equivalent weight of up to 175, wherein such polyether chain(s) include i) an internal propylene oxide-co-ethylene oxide block that contains 95 to 99% by weight polymerized propylene oxide, 1 to 5% by weight polymerized ethylene oxide and no more than 2% of other copolymerized monomers, based on the weight of the internal propylene oxide-co-ethylene block, and ii) a terminal propylene oxide-co-ethylene oxide block that contains 30 to 75% polymerized ethylene oxide, 25 to 70% by weight polymerized 1,2-propylene oxide and no more than 2% of other copolymerized monomers, wherein:

the internal propylene oxide-co-ethylene oxide block or blocks constitute 41 to 73% of the weight of the random polypropylene oxide-co-ethylene oxide) polymer;

the external propylene oxide-co-ethylene oxide block or blocks constitute 25 to 49% of the weight of the random poly(propylene oxide-co-ethylene oxide) polymer;

the internal and external blocks together constitute at least 90% of the weight of the random poly(propylene oxide-co-ethylene oxide) polymer;

39 to 60% of the hydroxyl groups of the poly(propylene oxide-co-ethylene oxide) polymer are primary hydroxyls and polymerized ethylene oxide constitutes 10 to 25% of the weight of the poly(propylene oxide-co-ethylene oxide) polymer.

The invention is also a method for making a polyurethane foam having a resiliency of at least 50% on the ASTM D3574 ball rebound test, and a foam density of 20 to 80 kg/m³, comprising reacting, in one or more steps and in the presence of at least one foam-stabilizing surfactant and at least one catalyst for the reaction of a hydroxyl group with an isocyanate group, polyurethane-forming reactants comprising one or more polyol(s) having a hydroxyl equivalent weight of at least 1000 g/mol, at least one polyisocyanate and water, wherein (I) the polyol(s) having a hydroxyl equivalent weight of at least 1000 g/mol constitute at least 55% by weight of the polyurethane-forming reactants, and (II) at least 20% by weight of said polyol(s) having a hydroxyl equivalent weight of at least 1000 g/mol is one or more random poly(propylene oxide-co-ethylene oxide) polymers of the first aspect of the invention.

The invention is also a process for making a polyether polyol, comprising:

a) activating a DMC catalyst complex in the presence of at least one hydroxyl-containing starter having a hydroxyl equivalent weight of up to 175 and a mixture of 95 to 99% by weight 1,2-propylene oxide, 1 to 5% by weight ethylene oxide and 0 to 2% by weight of other copolymerizable monomers;

b) polymerizing an oxide mixture containing 1,2-propylene oxide and ethylene oxide onto the hydroxyl-containing starter(s) in the presence of the activated DMC catalyst to produce a poly(propylene oxide-co-ethylene oxide) polymer having one or more terminal hydroxyl groups; wherein i) in a first stage, the oxide mixture introduced to the reaction contains 95 to 99% by weight 1,2-propylene oxide, 1 to 5% by weight ethylene oxide and 0 to 2% by weight of other copolymerizable monomers, until such time as 55 to 75% of the total amount of the oxide mixture is polymerized, and the remainder of the oxide mixture is thereafter introduced to the reaction in a second stage by feeding it to the reaction under polymerization conditions as an oxide feed in which the concentration of the ethylene oxide in the oxide feed is continuously or intermittently increased until the oxide feed contains 90 to 100% by weight ethylene oxide, 0 to 10% by weight 1,2-propylene oxide and 0 to 2% by weight of other copolymerizable monomers, based on the weight of the oxide feed, ii) the oxide feed is discontinued after the concentration of ethylene oxide in the oxide feed reaches 90% but before or at the same time as the concentration of ethylene oxide in the oxide feed reaches 100% by weight, and the reaction mixture is thereafter digested, and further wherein ii) the polypropylene oxide-co-ethylene oxide) polymer has a hydroxyl equivalent weight of 1500 to 3000, contains 10 to 25% by weight polymerized ethylene oxide, and contains 39 to 60% primary hydroxyl groups.

The random polypropylene oxide-co-ethylene oxide) polymer of the invention has surprisingly low haze and low viscosity. Despite its moderate primary hydroxyl content, it produces good quality high resiliency foam in both slabstock and molded foaming processes. The process of making the polyol permits one to obtain the benefits of double metal cyanide catalysis, including short cycle times and the ability to avoid a costly catalyst removal step. Capping with ethylene oxide is not necessary, and so the process steps and product disadvantages (such as turbidity and high viscosity) associated with ethylene oxide capping are avoided.

The process for manufacturing the random polypropylene oxide-co-ethylene oxide) polymer of the invention will be described first.

In this process, a DMC catalyst complex is activated in the presence of at least one hydroxyl-containing starter and a mixture of 95 to 99% by weight 1,2-propylene oxide, 1 to 5% by weight ethylene oxide and 0 to 2% of an additional copolymerizable monomer.

Suitable double metal cyanide catalysts include those described, for example, in U.S. Pat. Nos. 3,278,457, 3,278,458, 3,278,459, 3,404,109, 3,427,256, 3,427,334, 3,427,335 and 5,470,813. Some suitable DMC catalysts can be represented by the formula

$$M_b[M^1(CN)_r(X)_t]_c[M^2(X)_6]_d \cdot nM^3{}_xA_y$$

wherein M and $M^3$ are each metals; $M^1$ is a transition metal different from M, each X represents a group other than cyanide that coordinates with the $M^1$ ion; $M^2$ is a transition metal; A represents an anion; b, c and d are numbers that reflect an electrostatically neutral complex; r is from 4 to 6; t is from 0 to 2; x and y are integers that balance the charges in the metal salt $M^3{}_xA_y$, and n is zero or a positive integer. The foregoing formula does not reflect the presence of neutral complexing agents such as t-butanol which are often present in the DMC catalyst complex.

M and $M^3$ each are preferably a metal ion independently selected from the group consisting of $Zn^{2+}$, $Fe^{2+}$, $Co^{+2+}$, $Ni^{2+}$, $Mo^{4+}$, $Mo^{6+}$, $Al^{+3+}$, $V^{4+}$, $V^{5+}$, $Sr^{2+}$, $W^{4+}$, $W^{6+}$, $Mn^{2+}$, $Sn^{2+}$, $Sn^{4+}$, $Pb^{2+}$, $Cu^{2+}$, $La^{3+}$ and $Cr^{3+}$, with $Zn^{2+}$ being preferred.

$M^1$ and $M^2$ are preferably $Fe^{3+}$, $Fe^{2+}$, $Co^{3+}$, $Co^{2+}$, $Cr^{2+}$, $Cr^{3+}$, $Mn^{2+}$, $Mn^{3+}$, $Ir^{3+}$, $Ni^{2+}$, $Rh^{3+}$, $Ru^{2+}$, $V^{4+}$, $V^{5+}$, $Ni^{2+}$, $Pd^{2+}$, and $Pt^{2+}$. Among the foregoing, those in the plus-three oxidation state are more preferred as the $M^1$ and $M^2$ metal. $Co^{+3}$ and $Fe^{+3}$ are even more preferred and $Co^{+3}$ is most preferred.

Suitable anions A include but are not limited to halides such as chloride, bromide and iodide, nitrate, sulfate, carbonate, cyanide, oxalate, thiocyanate, isocyanate, perchlorate, isothiocyanate, an alkanesulfonate such as methanesulfonate, an arylenesulfonate such as p-toluenesulfonate, trifluoromethanesulfonate (triflate) and a $C_{1-4}$ carboxylate. Chloride ion is especially preferred.

r is preferably 4, 5 or 6, preferably 4 or 6, and most preferably 6; t is preferably 0 or 1, most preferably 0. In most cases, r+t will equal six.

A suitable type of DMC catalyst is a zinc hexacyanocobaltate catalyst complex as described, for example, in any of U.S. Pat. Nos. 3,278,457, 3,278,458, 3,278,459, 3,404,109, 3,427,256, 3,427,334, 3,427,335 and 5,470,813. An especially preferred type of DMC catalyst is complexed with t-butanol.

The amount of DMC catalyst complex is generally expressed in terms of parts by weight of metals in the catalyst per million parts by weight of the product. A suitable amount is, for example, 5 to 500 parts per million, especially 5 to 200 parts per million, 5 to 100 parts per million or 5 to 50 parts per million.

If desired, the DMC-catalyzed polymerization can be performed in the presence of an MG3-15LA compound as described in WO 2012/091968.

The hydroxyl-containing starter is one or more compound(s) that has at least two, preferably 2 to 4, hydroxyl groups per molecule and which has a hydroxyl equivalent weight of up to 175. The starter may be, for example, one or more of ethylene glycol, diethylene glycol, triethylene glycol, propylene glycol, dipropylene glycol, tripropylene glycol, 1,4-butane diol, 1,6-hexane diol, glycerine, trimethylolpropane, trimethylolethane, pentaerythritol, erythritol, and the like. The starter may be a polyether polyol having 2 to 4 hydroxyl groups and a hydroxyl equivalent weight of up to 175, including a propoxylate and/or ethoxylate of any of the starters mentioned in the preceding sentence. An especially preferred starter is a propoxylate of any of the starters mentioned in the preceding sentence, especially glycerin or trimethylolpropane, having a hydroxyl equivalent weight of 100 to 175, especially 120 to 160.

The DMC catalyst is activated in the presence of the starter and a mixture of 95 to 99% by weight 1,2-propylene oxide and 1 to 5% by weight ethylene oxide. If any other copolymerizable monomers are present in this step, they constitute 2% or less, of the combined weight of all monomers. Such other monomers preferably are present in an amount of 0.5% or less by weight, and are most preferably absent during this step. The activation step can be combined with the first stage of the polymerization step, by adding some or all the monomers to be polymerized in the first stage of the polymerization step and activating the catalyst in the presence of those monomers. Alternatively, it can be done as a separate step. In the latter case, the monomers added during the activation step may constitute, for example, 0.5 to 5% of the weight of the product.

In the activation step, the DMC catalyst is combined with the starter and typically a small amount of an oxide mixture as just described, and the combination subjected to polymerization conditions until such time as polymerization begins. Typically, there is some period of inactivity during which little or no polymerization is seen. This is followed by the start of rapid polymerization and consumption of the oxide mixture. Because the activation step is performed in the presence of a mixture of propylene oxide and ethylene oxide, the formation of a large block of homopolymerized propylene oxide can be avoided.

Once the DMC catalyst is activated, an oxide mixture is polymerized onto the starter. This is done in two stages. In the first stage, the oxide mixture contains 95 to 99% by weight 1,2-propylene oxide and 1 to 5% by weight ethylene oxide. This oxide mixture may contain one or more other monomers in amounts as described with respect to the activation step, but these monomers preferably are absent. This oxide mixture constitutes 41 to 73%, preferably 50 to 73% and more preferably 50 to 69% of the total weight of the product. The total weight of the product is considered as the weight of the starter compound(s) plus the total weight of all alkylene oxides polymerized onto the starter during the activation and subsequent polymerization steps.

The oxide mixture added and polymerized in this first stage may be added to the reaction vessel all at once. It is generally preferred to feed the oxide mixture continuously or intermittently during this step of the polymerization, under polymerization conditions, to control internal reactor pressures and to control the level of unreacted oxides in the reaction vessel to a reasonable level, such as up to 10% by weight, preferably from 1 to 6% by weight and more preferably 1 to 4% by weight. The oxide mixture may be fed on demand during this first stage, by introducing the oxide mixture as it is consumed, to produce a constant reactor pressure during this stage.

Once the foregoing oxide mixture has polymerized, a second stage is performed by feeding the remaining amount of the oxide mixture to the reaction. As this remaining oxide mixture is fed, the concentration of the ethylene oxide in the feed is continuously or intermittently increased until the feed contains 90 to 100% by weight ethylene oxide, 0 to 10% by weight 1,2-propylene oxide and 0 to 2% of additional copolymerizable monomers. It is preferred to increase the concentration of ethylene oxide in the feed to at least 95% and more preferably to at least 98% by weight.

The oxide feed of the second stage of the polymerization is done under polymerization conditions. The oxide feed added during this step may contain small amounts of other copolymerizable monomers as described above, but as before it is preferably devoid of such additional monomers.

The concentration of ethylene oxide in the oxide feed of the second stage may be increased linearly with time, or step-wise. If increased step-wise, it may be increased in at least two, at least three, at least 4 or at least 5 steps, or any larger number of increments. The various increments do not need to be equal in duration or in the amounts of oxides fed during each step. At any time during the oxide feed, the concentration of ethylene oxide in the oxide feed may be within 30%, within 20% or within 10%, of the concentration that would have been achieved at such time if the ethylene oxide concentration in the oxide feed were increased linearly with time.

The average concentration of ethylene oxide fed during the second stage of the polymerization may be, for example, 30 to 75% or 30 to 60% of the combined weight of all monomers fed during the second stage. The average concentration of 1,2-propylene oxide added during this second stage may constitute 25 to 70% or 40 to 60% of the combined weight of all monomers fed during the second stage.

As before, the feed rate during this second stage of the polymerization preferably is such that the level of unreacted oxides in the reaction vessel is controlled to a reasonable level, such as up to 10% by weight, preferably from 1 to 6% by weight and more preferably 1 to 4% by weight. As before, the monomers may be fed on demand during this second stage, by introducing the monomers as they are consumed, to maintain a constant reactor pressure during this step.

The oxide feed is discontinued when the ethylene oxide concentration in the feed is at least 90% by weight, but no later than the time the ethylene oxide concentration in the feed reaches 100% by weight. It may be discontinued at any time between that at which the ethylene oxide concentration in the feed reaches 90% and the time it reaches 100% by weight. The time required to complete the oxide feed (and increase the ethylene oxide to its final concentration) in this step of increasing the ethylene oxide concentration may be, for example, 30 minutes to 5 hours, preferably 1 to 3.5 hours and especially 1.25 to 3.5 hours.

At the conclusion of all additions of alkylene oxide to the reaction (including the catalyst activation, the first and second stages of the polymerization step), the total amount of ethylene oxide added into the process is 10 to 25%, preferably 10 to 22% and more preferably 13 to 20% of the total weight of the product, i.e., the combined weight of all monomers plus starter. The total amount of propylene oxide added in the process is 65 to 88%, preferably 68 to 88% and more preferably 70 to 84% of the total weight of the product. The starter preferably constitutes 2 to 10% of the total weight of the product. Other copolymerizable monomers preferably constitute amounts as indicated before, if present at all.

After the oxide feed is completed, the reaction mixture is digested to complete the reaction of the alkylene oxides. No further addition of alkylene oxides is performed during or after the digestion step. The digestion includes continued exposure of the reaction mixture to polymerization conditions in the presence of the DMC catalyst complex to polymerize most or all of the remaining alkylene oxides. The amount of unreacted alkylene oxides may be reduced in this step to, for example, less than 2%, less than 1% or less than 0.5% by weight.

The resulting product may be worked up if desired by separating unreacted oxides and impurities. The catalyst residues may be removed from the product if desired, although it is preferred to leave them with the product.

The polymerization conditions include an elevated temperature. The polymerization temperature is typically at least 80° C. up to about 180° C. A preferred temperature is 120 to 160° C. The polymerization reaction usually is performed at superatmospheric pressure, but can be performed at atmospheric pressure or even subatmospheric pressures. Polymerization conditions are maintained during the activation step, the first and second polymerization stages and during the digestion after all oxides have been fed to the reactor. The reaction conditions do not need to be identical throughout each of these periods, as long as polymerization conditions are maintained.

Enough of the oxide mixture is polymerized in the foregoing process to produce a poly(propylene oxide-co-ethylene oxide) polymer having a hydroxyl equivalent weight of 1500 to 3000.

The poly(propylene oxide-co-ethylene oxide) polymer of the invention in some embodiments has a hydroxyl equivalent weight of 1500 to 2500, and in other embodiments has a hydroxyl equivalent weight of 1500 to 2200.

The random poly(propylene oxide-co-ethylene oxide) polymer has a hydroxyl equivalent weight of 1500 to 3000. It comprises one or more polyether chains extending from the residue of a hydroxyl-containing starter compound that has a hydroxyl equivalent weight of up to 175. Such polyether chains include an internal propylene oxide-co-ethylene oxide block that contains 95 to 99% by weight polymerized propylene oxide, 1 to 5% by weight polymerized ethylene oxide and no more than 2% of other copolymerized monomers, based on the weight of the internal propylene oxide-co-ethylene block. Such polyether chains further include a terminal propylene oxide-co-ethylene oxide block that contains 30 to 75%, preferably 30 to 60%, by weight polymerized ethylene oxide, 25 to 70%, preferably 40 to 70%, by weight polymerized 1,2-propylene oxide and no more than 2% of other copolymerized monomers.

The internal propylene oxide-co-ethylene oxide block or blocks constitute 41 to 73%, preferably 50 to 73% and more preferably 50 to 69%, of the weight of the random poly (propylene oxide-co-ethylene oxide) polymer.

The external propylene oxide-co-ethylene oxide block or blocks constitute 25 to 49%, preferably 25 to 40% and more preferably 30 to 40%, of the weight of the random poly (propylene oxide-co-ethylene oxide) polymer.

The internal and external blocks together constitute at least 90%, preferably 91 to 98%, of the weight of the random poly(propylene oxide-co-ethylene oxide) polymer. The remainder of the weight is constituted by residue of the initiator. The residue is what remains of the initiator compound after removal of the hydroxyl hydrogen atoms.

39 to 60%, preferably 40 to 55%, of the hydroxyl groups of the poly(propylene oxide-co-ethylene oxide) polymer are primary hydroxyls.

The random poly(propylene oxide-co-ethylene oxide) polymer contains 10 to 25%, preferably 10 to 22% and more preferably 13 to 20%, by weight polymerized ethylene oxide. The ethylene oxide is randomly polymerized, by which it is meant only that the ethylene oxide is present as a mixture with propylene oxide during the polymerization, so the polymerization of ethylene oxide and that of propylene oxide take place simultaneously. The incorporation of ethylene oxide and propylene oxide into the polymer chain may not be statistically random.

The poly(propylene oxide-co-ethylene oxide) polymer has a nominal hydroxyl functionality equal to the average number of hydroxyl groups per molecular of starter compound(s). As is well known, the actual functionality of a polyether polyol (i.e., the actual average number of hydroxyl groups per molecule) is lower than the nominal functionality due to certain side reactions that occur during the polymerization process. When propylene oxide is polymerized, the predominant side reaction that affects functionality is an isomerization of propylene oxide to propenyl alcohol or allyl alcohol. The propenyl alcohol or allyl alcohol then functions as a monofunctional initiator onto which propylene oxide and ethylene oxide can polymerize, to form monofunctional species whose presence reduces the average functionality of the product. Because these monofunctional species have a terminal propenyl or allyl group, which is unsaturated, the amount of unsaturated species in the product can be measured as an indication of the amount of monofunctional species. The random copolymer of the invention has no more than 0.01 milliequivalents of unsaturation per gram of copolymer. The amount of terminal unsaturation may be up to 0.007 meq/g or up to 0.005 meq/g.

In this invention, the poly(propylene oxide-co-ethylene oxide) polymer is useful as a starting material in a process for making high resiliency polyurethane foam. The process is generally characterized by reacting polyurethane-forming reactants in the presence of a surfactant, a blowing agent and catalyst. "Polyurethane-forming reactants" are all isocyanate compounds and all other compounds that react with isocyanate compounds in the curing step. The polyurethane-forming reactants include one or more polyol(s) having a hydroxyl equivalent weight of at least 1000 g/mol, at least one crosslinker, at least one polyisocyanate and water. The polyol(s) having a hydroxyl equivalent weight of at least 1000 constitute at least 55% by weight of the polyurethane-forming reactants, and the poly(propylene oxide-co-ethylene oxide) polymer of the invention constitutes at 20% by weight of said polyol(s) having a hydroxyl equivalent weight of at least 1000.

The polypropylene oxide-co-ethylene oxide) polymer of the invention, or a mixture of two or more such polyols, may constitute at least 30%, at least 40%, at least 50% or at least 60% by weight of the polyol(s) having a hydroxyl equivalent weight of at least 1000. The polypropylene oxide-co-ethylene oxide) polymer may constitute up to 100%, up to 95%, up to 90%, up to 80%, up to 75%, up to 70% or up to 65% by weight thereof.

One or more additional polyols having a hydroxyl equivalent weight of at least 1000 (i.e., one or more polyols having a hydroxyl equivalent weight of at least 1000 but which is different than the random copolymer of the invention) may be included in the polyurethane-forming reactants. Such additional polyols may have hydroxyl equivalent weights of 1000 to 5000, preferably 1000 to 3000. Such additional polyols may be, for example, one or more polyether polyols, polyester polyols, hydroxyl-terminated polybutadiene polymers, hydroxyl-terminated acrylate polymers, and the like. Specific examples of such polyols include, for example:

a) homopolymers of ethylene oxide or a mixture of at least 50% by weight ethylene oxide and up to 50% by weight 1,2-propylene oxide. Such polyols preferably have a number average molecular weight of 3000 to 12000, and an average nominal functionality of 2 to 8, preferably 2 to 4. If present, they preferably constitute 0.5 to 5 percent of the total weight of the polyols having a hydroxyl equivalent weight of at least 1000. Polyols of this type are often included in flexible polyurethane foam formulations to help produce an open-celled foam; and b) one or more polymers of at least 70% by weight 1,2-propylene oxide and up to 30% by weight ethylene oxide, in which at least 50%, preferably at least 70% of the hydroxyl groups are primary hydroxyl group. Polyols of this type may have number average molecular weights of 3000 to 8000, preferably 4500 to 6000, and may have average nominal functionalities of 2 to 8, preferably 3 to 6. Such polyol(s) may contain greater than 0.010 milliequivalents of terminal unsaturation and may be produced using a potassium hydroxide polymerization catalyst. If present, one or more polyols of this type may constitute, up to 80%, up to 75%, up to 60% or up to 50% of the total weight of polyols having an equivalent weight of at least 1000. In some embodiments, such polyols constitute at least 10%, at least 25%, or at least 40% of the total weight of polyols having an equivalent weight of at least 1000.

Any of the polyols having an equivalent weight of at least 1000 may contain dispersed polymer particles. The dispersed polymer particles may be, for example, polyurethane, polyurethane-urea, polyhydrazide, polyurea, polystyrene, and/or styrene-acrylonitrile particles. The weight of any such dispersed polymer particles is disregarded for purposes of calculating the equivalent weight of such a polymer dispersion.

The polyurethane-forming reactants may include at least one crosslinker, by which it is meant one or more compounds having at least three hydroxyl groups and/or amine hydrogen atoms, and an equivalent weight per hydroxyl group and/or amine hydrogen atom of up to 150, preferably up to 100 and more preferably up to 75. The equivalent weight of the crosslinker is the number average molecular weight divided by the total number of hydroxyl groups and amine hydrogen atoms. Examples of crosslinkers include trimethylolpropane, trimethylolethane, glycerine, erythritol, pentaerythritol, triethanolamine, diethanolamine, monoethanol amine, other aminoalcohols having an equivalent weight of up 150, ethylene diamine, diethylene triamine, triethylene pentamine, isophorone diamine, cyclohexane diamine, other aliphatic diamines having an equivalent weight of up to 150, phenylene diamine, diethyltoluenediamine, and other aromatic diamines having an equivalent weight of up to 150. The crosslinker is generally used in small amounts, such as from 0.1 to 2 parts, preferably 0.2 to 0.5 parts by weight, per 100 parts by weight of the polyol(s) having an equivalent weight of at least 1000.

Water is preferably present in an amount of 1 to 5, preferably 1.1 to 4.5 and more preferably 1.2 to 4 parts per 100 parts by weight of the polyol(s) having an equivalent weight of at least 1000.

The polyisocyanate contains at least 2 isocyanate groups per molecule. The polyisocyanate compound(s) may have, for example, an average of 2 to 4 or 2.3 to 3.5 isocyanate groups per molecule. The polyisocyanate preferably has an isocyanate equivalent weight of 80 to 250, more preferably 80 to 200 and still more preferably 80 to 150. The isocyanate groups may be aliphatic, cycloaliphatic or aromatic, but in general aromatic polyisocyanates are preferred.

Among the useful aromatic polyisocyanate compounds m-phenylene diisocyanate, toluene-2,4-diisocyanate, toluene-2,6-diisocyanate, naphthylene-1,5-diisocyanate, methoxyphenyl-2,4-diisocyanate, diphenylmethane-4,4'-diisocyanate, diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, polymethylene polyphenylisocyanate (PMDI), toluene-2,4,6-triisocyanate and 4,4'-dimethyldiphenylmethane-2,2',5,5'-tetraisocyanate. Modified aromatic polyisocyanates that contain urethane, urea, biuret, carbodiimide, uretoneimine, allophonate or other groups formed by reaction of an isocyanate groups are also useful. A preferred aromatic polyisocyanate is MDI or PMDI (or a mixture thereof that is commonly referred to as "polymeric MDI", and so-called "liquid MDI" products that are mixtures of MDI and MDI derivatives that have biuret, carbodiimide, uretoneimine and/or allophonate linkages. Another preferred aromatic polyisocyanate is toluene diisocyanate (TDI), in particular a mixture of 60 to 90% of the 2,4-isomer and 10 to 40% of the 2,6-isomer.

Examples of aliphatic and cycloaliphatic polyisocyanates include cyclohexane diisocyanate, 1,3- and/or 1,4-bis(isocyanatomethyl)cyclohexane, 1-methyl-cyclohexane-2,4-diisocyanate, 1-methyl-cyclohexane-2,6-diisocyanate, methylene dicyclohexane diisocyanate, isophorone diisocyanate and hexamethylene diisocyanate.

The amount of polyisocyanate in some cases is selected in conjunction with the amounts of other ingredients such that the foam has a hard segment content of 2 to 45% by weight. For purposes of this invention, the hard segment content of the foam is calculated on the basis of the weights of the polyurethane-forming reactants as follows:

$$HS\ \% = \frac{wt_{iso} + wt_{lmw}}{wt_{tot}} \times 100\%$$

wherein HS % is the weight percent of hard segment, t w is the weight of the polyisocyanate(s), $wt_{lmw}$ is the total weight of all isocyanate-reactive components in the reaction mixture that have equivalent weights of 150 or below, including the crosslinker but not including the water, and $wt_{tot}$ is the total weight of all polyurethane-forming reactants except the water. A preferred hard segment content is 25 to 45% and a more preferred hard segment is 30 to 45% or 30 to 40% by weight.

In addition, the amount of polyisocyanate preferably is selected to provide an isocyanate index of 60 to 140, more preferably 70 to 130 and even more preferably 80 to 120

Isocyanate index is 100 times the ratio of isocyanate groups to isocyanate-reactive groups provided by the polyurethane-forming reactants. Water and a primary amine group each are considered as having two isocyanate-reactive groups.

In addition to the foregoing polyurethane-forming reactants, other isocyanate-reactive compounds can be included, such as chain extenders and polyols having an equivalent weight of greater than 150 up to 1000. If present, these materials preferably are present in only small amounts, such as up to 10%, more preferably up to 5%, of the weight of the polyol(s) having an equivalent weight of at least 1000.

To produce the foam, the polyurethane-forming reactants are reacted in one or more steps in the presence of at least one foam-stabilizing surfactant and at least one catalyst for the reaction of a hydroxyl group with an isocyanate group.

The foam-stabilizing surfactant helps stabilize the gas bubbles produced during the foaming process until the polymer has cured. A wide variety of silicone surfactants as are commonly used in making polyurethane foams can be used in making the foams with the polymer polyols or dispersions of this invention. Examples of such silicone surfactants are commercially available under the tradenames Tegostab™ (Evonik), Niax™ (Momentive) and Dabco™ (Air Products and Chemicals).

Suitable catalysts include, for example, tertiary amines, cyclic amidines, tertiary phosphines, various metal chelates, acid metal salts, strong bases, various metal alcoholates and phenolates and metal salts of organic acids. Most catalysts for the alcohol-isocyanate reaction also catalyze the reaction between water and the isocyanate groups to a greater or lesser extent. It is preferred to use one or more catalysts that effectively catalyzes both the hydroxyl-isocyanate and water-isocyanate reactions, or at least one catalyst that is effective for the alcohol-isocyanate reaction and at least one other catalyst that is effective for the water-isocyanate reaction.

The catalyst may be or include one or more tin catalysts such as stannic chloride, stannous chloride, stannous octoate, stannous oleate, dimethyltin dilaurate, dibutyltin dilaurate, tin ricinoleate and other tin compounds of the formula $SnR_n(OR)_{4-n}$, wherein R is alkyl or aryl and n is 0 to 18, and the like. Other useful tin catalysts include dialkyl tin mercaptides such as dioctyltinmercaptide, dibutyltinmercaptide and dibutyltin mercaptide.

Examples of other metal-containing catalysts are bismuth, cobalt and zinc salts.

Examples of tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether (DMEE), triethylenediamine and dimethylalkylamines where the alkyl group contains from 4 to 18 carbon atoms. Useful amidine catalysts include 1,8-diazabicyclo[5.4.0]-undec-7-ene. The amine catalyst may be a non-emissive type that contains one or more isocyanate-reactive amino or hydroxyl groups, such as those sold by Air Products under the trade designations Dabco™ RP202, Dabco™ NE1070, Dabco™ NE1909, and the like.

In some embodiments, a polyol component of the foam formulation may be amine-initiated, in which case the tertiary amine residue in the polyol can function as a catalyst. In such a case, that polyol functions as a catalyst as well as a reactant in the polyurethane-forming reaction.

In addition to the foregoing ingredients, the foam-forming reaction may be performed in the presence of one or more optional ingredients such as colorants, biocides, antioxidants, preservatives, flame retardants, filler particles, reinforcing fibers, physical blowing agents, other chemical blowing agents and the like. Any or all of these may be absent from the reaction mixture. In particular, it is preferred to use water as the sole blowing agent.

The reaction of the polyurethane-forming reactants is in general carried out by simply mixing the starting materials and allowing them to react. The reaction in most cases proceeds spontaneously even at room temperature, and in some embodiments the mixing of the isocyanate-reactive ingredients with the polyisocyanates is performed with the various ingredients at approximately room temperature, such as from 15 to 35° C., and the resulting reaction mixture is then allowed to react without additional heating. Alternatively, one or more of the various ingredients can be preheated to a temperature of, for example, 35 to 80° C. before being combined with the other ingredients to produce the foam. In other embodiments, the reaction mixture is heated to a temperature of, for example, 35 to 80° C., after it is formed to help drive the cure. In still other embodiments, the reaction mixture is introduced into mold that is preheated to a temperature of 35 to 80° C. and allowed to cure in the mold without further application of heat.

Foam can be prepared in a free-rise (slabstock) process or a molding process. In a free-rise process, the reaction mixture is introduced into an open container and allowed to expand in at least the vertical direction under no restraint or only minimal restraint (such as the weight of a polymeric film). In an industrial slabstock foam process, the reaction mixture is formed continuously by bringing the various ingredients individually or in various subcombinations to a mixing head, where they are continuously mixed and dispensed into a trough in which the reaction mixture expands and cures.

In a molding process, the various ingredients or various subcombinations thereof are mixed and introduced into a mold, and cured in the closed mold. The amount of reaction mixture introduced into the mold is such that upon expansion and curing, the mold is filled and the density of the foam produced is 20 to 80 kg/m$^3$. The mold may be preheated to avoid heat sink effects. In a so-called "cold-molding" process, the mold is optionally preheated to 35 to 80° C., preferably 40 to 60° C., and curing takes place in the mold without further heating of the mold. In a hot-molding process, the mold may or may not be preheated, and after the reaction mixture is introduced, the mold is externally heated (such as in an oven) to 35° to 80° C., preferably 50 to 80° C. until the reaction mixture cures at least enough to form a stable foam that can be demolded without permanent damage.

The resulting foam is characterized by having a resiliency of at least 50% on the ASTM D3574ball rebound test and a foam density of 20 to 80 kg/m$^3$. The resilience may be, for example at least 55%. Slabstock foams of the invention more commonly have foam densities of 25 to 55 kg/m$^3$, whereas molded foams of the invention more commonly have foam densities of 40 to 80 kg/m$^3$ or 40 to 60 kg/m$^3$. Foam densities are core foam densities measured according to ISO 845-88.

The high resiliency foam is useful in various cushioning applications, such as in mattresses, seating, pillows, packaging applications, and the like.

The following examples are provided to illustrate the invention but are not intended to limit the scope thereof. All parts and percentages are by weight unless otherwise indicated.

EXAMPLES 1-5 AND COMPARATIVE POLYOLS A-C

Polypropylene oxide-co-ethylene oxide) polymer Examples 1 and 2 are prepared in the following manner:

691 g of a 450 molecular weight (150 equivalent weight) propoxylated glycerin and 225 mg of a zinc hexacyanocobaltate catalyst complex are introduced into a 10 liter reactor. The reactor is heated to 160° C. and pressurized with nitrogen. 77 g of a blend of 98% 1,2-propylene oxide (PO) and 2% ethylene oxide (EO) are fed to the reactor. The reactor pressure is monitored and when the pressure drops, indicating that the catalyst has become activated, 4316 g of a mixture of 98% PO and 2% EO is feed to the reactor over a period of 185 minutes. Then, the feed is continued for another 105 minutes, while linearly increasing the EO concentration in the feed to 100%, until an additional 1232 g of EO and 1184 g of PO are added. The feed is discontinued when the ethylene oxide concentration reaches 100%, and the reactor contents are digested for 20-30 minutes to consume residual monomers.

The resulting polypropylene oxide-co-ethylene oxide) polymers each contain 17.6% polymerized ethylene oxide. Each polymer contains polyether chains made up of a short polypropylene oxide) segment contributed by the initiator, an internal block which has 2% polymerized ethylene oxide and 98% polymerized propylene oxide, and an external block that contains, on average, 51% by weight polymerized ethylene oxide. The internal blocks constitute about 58.6% of the weight of the polymer. The external blocks constitute about 32.2% of the weight of the polymer. The residue of the initiator constitutes about 9.2% of the weight of the polyether.

Example 1 has a hydroxyl number of 34.5, which corresponds to a hydroxyl equivalent weight of 1626. It contains 50.4% primary hydroxyl groups. Its Brookfield viscosity at 25° C. is 1000 cps. It is slightly hazy in appearance at 60° C.

Example 2 has a hydroxyl number of 34.9, which corresponds to a hydroxyl equivalent weight of 1607. It contains 42.3% primary hydroxyl groups. Its viscosity at 25° C. is 1010 cps. It is slightly hazy in appearance at 60° C.

Comparative Polyol A is made in the same manner as Examples 1 and 2, except that after the digestion step, a pure ethylene oxide feed constituting 1.7% of the total weight of alkylene oxides is feed to the reactor, followed by a second digestion step. This produces a polyol having a hydroxyl number of 35.9, which corresponds to a hydroxyl equivalent weight of 1563. Comparative Polyol A contains 48.4% primary hydroxyl groups. Its viscosity at 25° C. is 1190 cps, which is almost 20% greater than either of Examples 1 and 2. Comparative Polyol A has a highly turbid appearance at 60° C.

Examples 3-6 are made in the same general manner as Examples 1 and 2, except that after the initial feed of 98% PO and 2% EO is completed, the remainder of the alkylene oxides are added more slowly, over a period of 190 minutes, again with a linear increase in ethylene oxide concentration during that time.

Examples 3-6 have hydroxyl numbers of 34.1 to 35.6, which correspond to hydroxyl equivalent weights of 1573 to 1635. They contain 40.3 to 42.8% primary hydroxyl groups. The viscosity at 25° C. is only 942-967 cps. They are even less hazy in appearance at 60° C. than Examples 1 and 2.

Comparative Polyol B is made in the same manner as Examples 3-6, except that after the digestion step, a pure ethylene oxide feed constituting 3% of the total weight of alkylene oxides is feed to the reactor, followed by a second digestion step. This produces a polyol having a hydroxyl number of 35.1, which corresponds to a hydroxyl equivalent weight of 1598. Comparative Polyol B contains 51% primary hydroxyl groups. Its viscosity at 25° C. is 1210 cps, which is about 25% greater than Examples 3-6. Comparative Polyol B is very turbid in appearance at 60° C.

Comparative Polyol C is made in the same manner as Comparative Polyol B, except the pure ethylene oxide feed constitutes 1.7% of the total weight of alkylene oxides is feed to the reactor. This produces a polyol having a hydroxyl number of 35, which corresponds to a hydroxyl equivalent weight of 1603. Comparative Polyol C contains 50% primary hydroxyl groups. Its viscosity at 25° C. is 1210 cps, which is about 25% greater than Examples 3-6, and is very turbid in appearance at 60° C.

High resiliency polyurethane foams are made using poly (propylene oxide-co-ethylene oxide) polymer Examples 1, 2 and 5. Comparative foam F-A does not contain a poly (propylene oxide-co-ethylene oxide) polymer of the invention, being made instead exclusively with ethylene oxide-capped polyols that are the product of anionic polymerization. Foams are made by mixing the ingredients listed in Table 1 through low-pressure foaming equipment at room temperature and dispensing the resulting reaction mixture into an open container where it rises against its own weight to form a high resiliency slabstock polyurethane foam. Core density of the cured foam is measured according to ISO 845-88 and foam resiliency is measured according to ASTM D3574.

Polyol A is a nominally trifunctional ethylene oxide-capped poly(propylene oxide) having a hydroxyl equivalent weight of 2000 g/mol, made in an anionic polymerization process with a potassium hydroxide catalyst.

The Cell Opener is a nominally trifunctional copolymer of a major amount of ethylene oxide and a minor amount of propylene oxide. It has a hydroxyl equivalent weight of 1680 g/mol, and is made in an anionic polymerization with a potassium hydroxide catalyst.

The Catalyst Mixture is a mixture of commercial solutions of triethylene diamine, (2-dimethylaminoethyl)ether and stannous octoate.

The Crosslinkers are a mixture of diethanolamine and a commercial product sold by Evonik as Ortegol™ 204.

TABLE 1

| Ingredient | F-A* | Foam 1 | Foam 2 | Foam 3 | Foam 4 |
| --- | --- | --- | --- | --- | --- |
| | Parts by Weight | | | | |
| Polyol A | 95 | 75 | 75 | 45 | 75 |
| Cell Opener | 5 | 5 | 5 | 5 | 5 |
| Polyol Ex. 1 | 0 | 20 | 0 | 0 | 0 |
| Polyol Ex. 2 | 0 | 0 | 20 | 50 | 0 |
| Polyol Ex. 5 | 0 | 0 | 0 | 0 | 20 |
| Crosslinkers | 2.5 | 2.5 | 2.5 | 2.5 | 2.5 |
| Catalyst Mixture | 0.25 | 0.25 | 0.25 | 0.25 | 0.25 |
| Silicone Surfactant | 0.4 | 0.4 | 0.4 | 0.4 | 0.4 |
| Toluene diamine (80% 2,4-isomer) (to 100 Index) | 41.17 | 41.34 | 41.34 | 41.60 | 41.36 |
| Foam Density, kg/m$^3$ | 31.2 | 32.7 | 32.3 | 31.9 | 33.8 |
| Resiliency, % | 51 | 53 | 50 | 51 | 55 |

*Not an example of this invention.

When substituting as much as 50% of the polyols in this formulation with the poly(propylene oxide-co-ethylene oxide) polymer of the invention, good quality foam having properties essentially unchanged from the control are obtained.

What is claimed is:

1. A random poly(propylene oxide-co-ethylene oxide) polymer having a hydroxyl equivalent weight of 1500 to 3000, the random polymer comprising one or more polyether chains extending from the residue of a hydroxyl-containing starter compound having a hydroxyl equivalent weight of up to 175, wherein such polyether chain(s) include i) an internal propylene oxide-co-ethylene oxide block that contains 95 to 99% by weight polymerized propylene oxide, 1 to 5% by weight polymerized ethylene oxide and no more than 2% by weight of other copolymerized monomers, based on the weight of the internal propylene oxide-co-ethylene block, and ii) a terminal propylene oxide-co-ethylene oxide block that contains 30 to 75% polymerized ethylene oxide, 25 to 70% by weight polymerized 1,2-propylene oxide and no more than 2% by weight of other copolymerized monomers, wherein:
   the internal propylene oxide-co-ethylene oxide block or blocks constitute 50 to 69% of the weight of the random poly(propylene oxide-co-ethylene oxide) polymer;
   the external propylene oxide-co-ethylene oxide block or blocks constitute 30 to 40% of the weight of the random poly(propylene oxide-co-ethylene oxide) polymer;
   the internal and external blocks together constitute at least 90% of the weight of the random poly(propylene oxide-co-ethylene oxide) polymer;
   40 to 55% of the hydroxyl groups of the poly(propylene oxide-co-ethylene oxide) polymer are primary hydroxyls,
   polymerized ethylene oxide constitutes 10 to 25% of the weight of the poly(propylene oxide-co-ethylene oxide) polymer, the residue of the starter compound constitutes 1 to 10% of the weight of the random poly(propylene oxide-co-ethylene oxide) polymer, and the internal blocks, external blocks and residue of the starter compound together constitute 100% of the weight of the random poly(propylene oxide-co-ethylene oxide) polymer.

2. The random polypropylene oxide-co-ethylene oxide) polymer of claim 1 wherein 45 to 55% of the hydroxyl groups are primary.

3. The random poly(propylene oxide-co-ethylene oxide) polymer of claim 2 which has a hydroxyl equivalent weight of 1500 to 2200.

4. The random poly(propylene oxide-co-ethylene oxide) polymer of claim 2 in which the starter compound has 2 to 4 hydroxyl groups per molecule.

5. The random poly(propylene oxide-co-ethylene oxide) polymer of claim 2 in which the starter compound has 3 hydroxyl groups per molecule.

6. A method for making a polyurethane foam having a resiliency of at least 50% on the ASTM D3574 ball rebound test and a foam density of 20 to 80 kg/m$^3$, comprising reacting, in one or more steps and in the presence of at least one foam-stabilizing surfactant and at least one catalyst for the reaction of a hydroxyl group with an isocyanate group, polyurethane-forming reactants comprising one or more polyol(s) having a hydroxyl equivalent weight of at least 1000 g/mol, at least one polyisocyanate and water, wherein (I) the polyol(s) having a hydroxyl equivalent weight of at least 1000 constitute at least 55% by weight of the polyurethane-forming reactants, and (II) at least 20% by weight of said polyol(s) having a hydroxyl equivalent weight of at least 1000 is one or more random poly(propylene oxide-co-ethylene oxide) polymers of claim 1.

7. A process for making a polyether polyol, comprising:
   a) activating a DMC catalyst complex in the presence of at least one hydroxyl-containing starter having a hydroxyl equivalent weight of up to 175 and a mixture of 95 to 99% by weight 1,2-propylene oxide, 1 to 5% by weight ethylene oxide and 0 to 2% by weight of other copolymerizable monomers;
   b) polymerizing an oxide mixture containing 1,2-propylene oxide and ethylene oxide onto the hydroxyl-containing starter(s) in the presence of the activated DMC catalyst to produce a poly(propylene oxide-co-ethylene oxide) polymer having one or more terminal hydroxyl groups; wherein
   i) in a first stage, the oxide mixture introduced to the reaction contains 95 to 99% by weight 1,2-propylene oxide, 1 to 5% by weight ethylene oxide and 0 to 2% by weight of other copolymerizable monomers, until such time as 55 to 75% of the total amount of the oxide mixture is polymerized, and the remainder of the oxide mixture is thereafter introduced to the reaction in a second stage by feeding it to the reaction under polymerization conditions as an oxide feed in which the concentration of the ethylene oxide in the oxide feed is continuously or intermittently increased until the oxide feed contains 90 to 100% by weight ethylene oxide, 0 to 10% by weight 1,2-propylene oxide and 0 to 2% by weight of other copolymerizable monomers, based on the weight of the oxide feed,
   ii) the oxide feed is discontinued after the concentration of ethylene oxide in the oxide feed reaches 90% but before or at the same time as the concentration of ethylene oxide in the oxide feed reaches 100% by weight, and the reaction mixture is thereafter digested, and further wherein
   iii) the polypropylene oxide-co-ethylene oxide) polymer has a hydroxyl equivalent weight of 1500 to 3000, contains 10 to 25% by weight polymerized ethylene oxide, and contains 40 to 55% primary hydroxyl groups.

8. The process of claim 7, wherein in the first stage of step b), the oxide mixture is fed continuously or intermittently to the reaction at a rate sufficient to maintain a level of unreacted oxides in the reaction vessel of 1 to 6% by weight.

9. The process of claim 8, wherein in the second stage of step b), the oxide feed is at a rate sufficient to maintain a level of unreacted oxides in the reaction vessel of 1 to 6% by weight.

* * * * *